United States Patent
Minami et al.

(10) Patent No.: US 7,871,728 B2
(45) Date of Patent: Jan. 18, 2011

(54) NONAQUEOUS ELECTROLYTE SECONDARY BATTERY

(75) Inventors: Keisuke Minami, Moriguchi (JP); Toyoki Fujihara, Moriguchi (JP); Yasuhiro Yamauchi, Moriguchi (JP); Toshiyuki Nohma, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 250 days.

(21) Appl. No.: 12/275,351

(22) Filed: Nov. 21, 2008

(65) Prior Publication Data

US 2009/0142651 A1 Jun. 4, 2009

(30) Foreign Application Priority Data

Nov. 30, 2007 (JP) ............................. 2007-311465

(51) Int. Cl.
*H01M 4/62* (2006.01)
(52) U.S. Cl. ................. 429/232; 429/233; 429/245; 429/247; 429/231.1; 429/231.3; 429/231.5; 429/231.6; 429/94
(58) Field of Classification Search ................ 429/232, 429/233, 245, 247, 231.1, 231.3, 231.5, 231.6, 429/94
See application file for complete search history.

(56) References Cited

U.S. PATENT DOCUMENTS 7,727,674 B2 * 6/2010 Yanagida et al. ............ 429/232

FOREIGN PATENT DOCUMENTS

| JP | 07-147159 | * | 6/1995 |
| JP | 07-147159 | A | 6/1995 |
| JP | 09-027344 | A | 1/1997 |
| JP | 10-233205 | A | 9/1998 |
| JP | 2000-058066 | A | 2/2000 |

* cited by examiner

*Primary Examiner*—Laura S Weiner
(74) *Attorney, Agent, or Firm*—Westerman, Hattori, Daniels & Adrian, LLP

(57) ABSTRACT

A nonaqueous electrolyte secondary battery of the present invention includes a positive electrode plate 21 having an uncoated part along at least one long side of a continuous positive electrode substrate $21_1$ coated with a positive electrode mixture layer $21_2$ containing a positive electrode active material. In the nonaqueous electrolyte secondary battery, the positive electrode mixture layer $21_2$ includes a lithium transition-metal compound capable of insertion and separation of lithium ion and 5 to 15% by mass of a conductive material with respect to the positive electrode mixture, the conductive material contains 70% by mass or more of flaked graphite particles with an average particle diameter ($D_{50}$) of 5 to 30 μm and an average thickness of 0.1 to 1.0 μm with respect to the whole amount of the conductive materials, and a packing density of the positive electrode mixture layer is 2.00 to 2.80 g/cc.

7 Claims, 6 Drawing Sheets

NONAQUEOUS ELECTROLYTE SECONDARY BATTERY

TECHNICAL FIELD

The present invention relates to a nonaqueous electrolyte secondary battery and especially relates to a nonaqueous electrolyte secondary battery with high output characteristics and high safety by using a positive electrode mixture including a particular content of a carbon material with a particular physical property as a conductive material, suitable for electric vehicles (EVs), hybrid electric vehicles (HEVs) and the like.

BACKGROUND ART

Exhaust controls of carbon dioxide gas and the like are being tightened up against a background of an enhancement of the environmental movement. In the car industry, not only automobiles using fossil fuels such as gasoline, diesel oil, and natural gas, but also EVs and HEVs have been developed actively. In addition, a recent sudden rise in prices of the fossil fuels has accelerated the development of EVs and HEVs. In addition, in the field of batteries for the EVs and the HEVs, nonaqueous electrolyte secondary batteries represented by a lithium ion secondary battery with higher energy density than other batteries are noticed, and the percentage of the nonaqueous electrolyte secondary battery has been increasing greatly.

On the other hand, the batteries for EVs and HEVs are required to achieve a highly developed traveling performance as a basic performance of automobiles as well as the environmental accommodation. In order to achieve the highly developed traveling performance, not only increasing a battery capacity for enabling the automobiles to travel long distance but also increasing a battery output power having an effect on acceleration performance or hill climbing performance of the automobiles, that is, improving a rapid discharge characteristic is needed.

In addition, in order to inhibit total energy consumption of EVs or HEVs, being able to collect a generated electric power at the time of deceleration by using an electric brake is needed, that is, in order to improve an input characteristic, improving a rapid charge characteristic of the battery is also needed. This is because, since actual driving of the automobiles has not only acceleration zones but also deceleration zones frequently, control of total energy consumption of EVs or HEVs depends on how much electric energy can be collected in the deceleration zone.

When such rapid discharging or charging is performed, a high current is applied in the battery, so that the battery internal resistance greatly affects battery characteristics. Especially, in the batteries for EVs or HEVs, in order to obtain the output/input characteristics sufficiently, even if a state of charge varies, a low and constant internal resistance is required. As for the internal resistance due to the variation of the state of charge, voltage is measured when a battery is charged or discharged at several points of current values for a certain period of time, and a slope of the voltage with respect to the current value is calculated to give an IV resistance value as the internal resistance. The IV resistance value is an index showing how much current can be applied to a battery.

Here, an example of specific structures of nonaqueous electrolyte secondary batteries 10 utilized for these EVs or HEVs will be described using FIGS. 2 to 6. FIG. 2 is a perspective view of a cylindrical nonaqueous electrolyte secondary battery. FIG. 3 is an exploded perspective view of a rolled electrode in the cylindrical nonaqueous electrolyte secondary battery in FIG. 2. FIG. 4 is a perspective view of the collector plate shown in FIG. 3.

FIG. 5 is a partially broken perspective view showing a state before the collector plate is pressed to the rolled electrode. Furthermore, FIG. 6 is a partially broken elevation view showing a state where the collector plate is pressed to the rolled electrode and a laser beam is irradiated.

As shown in FIG. 2, respective covers 12 are welded at both ends of a cylinder 11 to form a cylindrical shaped battery outer can 13, and a rolled electrode 20 as shown in FIG. 3 is put in the battery outer can 13 to form the nonaqueous electrolyte secondary battery 10. Pair of positive and negative electrode terminal devices 14 is placed on the covers 12. The rolled electrode 20 and the electrode terminal device 14 are connected in the battery outer can 13, and electric power generated from the rolled electrode 20 can be taken out from a pair of the electrode terminal devices 14. Moreover, a pressure switching gas exhaust valve 15 is placed on each cover 12.

As shown in FIG. 3, a strip-shaped separator 23 is interposed between a continuous positive electrode plate 21 and a continuous negative electrode plate 22, and then the whole is rolled spirally to form the rolled electrode 20. The positive electrode plate 21 includes a continuous substrate $21_1$ made of aluminum foil and a positive electrode mixture layer $21_2$ coated with slurry containing a positive electrode active material on both sides of the substrate $21_1$, and the negative electrode plate 22 includes a continuous substrate $22_1$ made of copper foil and a negative electrode mixture layer $22_2$ coated with slurry containing a carbon material as a negative electrode active material on both sides of the substrate $22_1$. Moreover, in the separator 23, a nonaqueous electrolyte is impregnated. In the nonaqueous electrolyte secondary battery 10, in order to keep output characteristics, the positive electrode plate 21 and the negative electrode plate 22 are designed so as to be thin, and in order that a facing area of the positive electrode plate 21 and the negative electrode plate 22 becomes large, the plates 21 and 22 are designed so as to have a continuous shape.

In the positive electrode plate 21, an uncoated part not coated with the positive electrode mixture layer $21_2$ is formed, and the uncoated part is protruded from an edge of the separator 23 to form a positive electrode substrate border $21_3$. Similarly, in the negative electrode plate 22, an uncoated part not coated with the negative electrode mixture layer $22_2$ is formed, and the uncoated part is protruded from an edge of the separator 23 to form a negative electrode substrate border $22_3$. Collector plates 30 are installed on both ends of the rolled electrode 20, respectively, and these collector plates 30 are attached to the positive electrode substrate border $21_3$ and the negative electrode substrate border $22_3$ by laser welding or electron beam welding, respectively. A leading end of a leading part 31 protruded from an edge of the collector plate 30 is connected to the electrode terminal device 14.

As shown in FIGS. 3 and 4, the collector plate 30 includes a round shaped planar body 32, and in the planar body 32, a plurality of arcuate convex parts 33 extended radially are formed as a single-piece and are protruded to a side of the rolled electrode 20. In addition, as shown by an arrow P in FIG. 5, the collector plate 30 is pressed in a direction of the positive electrode substrate border $21_3$ or the negative electrode substrate border $22_3$, and then is welded by laser beam (or electron beam) irradiation as shown by a broad arrow in FIG. 6. The welding is performed by sequential spot welding while moving the laser beam in a longitudinal direction of the arcuate convex part 33, and a bottom part of the arcuate convex part 33 and the positive electrode substrate border $21_3$ or the negative electrode substrate border $22_3$ are welded at a welded part 34. Thus, the positive electrode plate 21 and the negative electrode plate 22 are electrically connected to the respective collector plates 30 to collect electric current.

As shown in FIG. 3, the positive electrode plate 21 or the negative electrode plate 22 of the above-mentioned nonaqueous electrolyte secondary battery is prepared in the following manner: the positive electrode mixture slurry or the negative electrode mixture slurry is coated on the continuous positive electrode substrate $21_1$ or the continuous negative electrode substrate $22_1$ with a predetermined thickness so as to form the uncoated part in at least one side along a long side of the substrates $21_1$ or $22_1$, dried, and then compressed using a compression roll so as to have a predetermined thickness, respectively. However, in the nonaqueous electrolyte secondary battery 10 for EVs or HEVs, since the positive electrode plate 21 and the negative electrode plate 22 are designed so as to be thin and to have a large facing area of the positive and negative electrode plates 21 and 22, at the time of the compression, a distortion between the positive and negative electrode plates 21 and 22 becomes large, so that a rolling gap tends to be generated when the spiral rolled electrode 20 is prepared. Since such rolling gap of the electrode plate appears especially in the positive electrode plate 21 side largely and causes a inner short circuit, it is required to reduce the rolling gap as much as possible. As for a difference in the distortion formed in the positive and negative electrode plates 21 and 22, since strong power is needed to compress metal oxide as the positive electrode active material, distortion in the positive electrode tends to be generated in comparison with the negative electrode made of a carbon material.

As for a carbon material as a conductive material in the positive electrode mixture, JP-A-7-147159 and JP-A-10-233205 disclose one using flaky graphite powder with a thickness of 1 μm or below, an average particle diameter of 1 to 50 μm, and a specific surface area of 5 to 50 m²/g, JP-A-9-27344 discloses one using a mixture of scaly graphite and fibrous graphite with a mixing weight ratio of 85:15 to 25:75, and moreover, JP-A-2000-58066 discloses one using a mixture of acetylene black, scaly graphite, and vapor-grown fibrous graphite. However, in JP-A-7-147159, JP-A-10-233205, JP-A-9-27344, and JP-A-2000-58066, it is not suggested that the above mentioned problem is generated in case of using the positive electrode plate which is formed so that the uncoated part would be formed along a long side of the continuous positive electrode substrate coated with the positive electrode mixture layer containing the positive electrode active material.

The inventors of the present invention have carried out various experiments repeatedly in order to find a condition which reduces the distortion generated at the time of compression of the positive electrode mixture layer, in the positive electrode plate which is formed so that the uncoated part would be formed along a long side of the continuous positive electrode substrate coated with the positive electrode mixture layer containing the positive electrode active material. As a result, the inventors have found out to solve the problem by an addition of a particular content of a carbon material having a particular physical property to a positive electrode mixture, and have completed the present invention.

SUMMARY

An advantage of some aspects of the invention is to provide a nonaqueous electrolyte secondary battery with excellent safety suitable for EVs, HEVs and the like, wherein, by using a positive electrode mixture including a particular content of a carbon material with a particular physical property as a conductive material, little distortion is generated in a positive electrode plate at the time of compression, a rolling gap is hard to be generated when a rolled electrode is prepared, and an inner short circuit rarely occurs.

According to an aspect of the present invention, a nonaqueous electrolyte secondary battery of the present invention includes a rolled electrode. The rolled electrode includes a positive electrode plate having an uncoated part along at least one long side of a continuous positive electrode substrate coated with a positive electrode mixture layer containing a positive electrode active material, a negative electrode plate having an uncoated part along at least one long side of a continuous negative electrode substrate coated with a negative electrode mixture layer, and a separator laminated between the positive electrode plate and the negative electrode plate.

The positive electrode mixture layer includes a lithium transition-metal compound capable of insertion and separation of lithium ion, and 5 to 15% by mass of a conductive material with respect to the positive electrode mixture, the conductive material contains not less than 70% by mass of flaked graphite particles with an average particle diameter ($D_{50}$) of 5 to 30 μm and an average thickness of 0.1 to 1.0 μm with respect to the whole amount of the conductive material, and a packing density of the positive electrode mixture layer is 2.00 to 2.80 g/cc.

The nonaqueous electrolyte secondary battery of the present aspect of the invention needs to include 5 to 15% by mass of the conductive material with respect to the positive electrode mixture, and as the conductive material, not less than 70% by mass of flaked graphite particles with an average particle diameter ($D_{50}$) of 5 to 30 μm and an average thickness of 0.1 to 1.0 μm with respect to the whole amount of the conductive material, and needs to have a packing density of the positive electrode mixture layer after the compression of 2.00 to 2.80 g/cc. By fulfilling these conditions, in the nonaqueous electrolyte secondary battery of the present aspect of the invention, distortion occurring at the time of compression of the positive electrode plate formed to have the mixture layer with the substrate exposure part along a long side of the continuous substrate can be inhibited, so that the generation of rolling gap at the time of a preparation of the electrode roll is reduced. Thus, according to the nonaqueous electrolyte secondary battery of the present aspect of the invention, a nonaqueous electrolyte secondary battery which inhibits abnormal states such as inner short circuit, and suitable for EVs, HEVs and the like with excellent safety can be obtained.

If a mixing ratio of the positive electrode conductive material to the positive electrode mixture is less than 5% by mass, a formability of the positive electrode mixture deteriorates and enough output characteristics is not obtained, and if a mixing ratio of the positive electrode conductive material to the positive electrode mixture is more than 15% by mass, since the conductive material does not take part in battery reactions, a battery capacity deteriorates, and since a compression linear pressure becomes high when the positive electrode active material mixture is compressed to obtain the positive electrode plate with a predetermined thickness, distortion in the electrode plate tends to occur. Thus, it is preferred that a mixing ratio of the positive electrode conductive material to the positive electrode mixture is 5 to 15% by mass. Moreover, if a ratio of flaked graphite in the positive electrode conductive material is less than 70% by mass, since a reducing effect on the compression linear pressure in order to obtain the positive electrode plate with a predetermined thickness is insufficient, preferably, a ratio of flaked graphite in the positive electrode conductive material is 70% by mass or more.

Moreover, if an average thickness of the flaked graphite particles is thinner than 0.1 μm, fine particles tend to be dispersed to become difficult for handling, and dispersibility of the slurry deteriorates to degrade an electrode quality, and if an average thickness of the flaked graphite particles is thicker than 1.0 μm, at the time of the electrode plate compression, a compression linear pressure becomes high to generate distortion in the electrode plate. Moreover, if an average thickness of the flaked graphite particles is thicker than 1.0 μm, since the flaked graphite particles are too large, a resistance reducing effect as a conductive material is reduced, so that it becomes difficult to manufacture a high power battery. Thus, it is preferred that a thickness of flaked graphite particles is 0.1 to 1.0 μm. Moreover, if an average particle diameter ($D_{50}$) of the flaked graphite particles is less than 5 μm, dispersibility deteriorates, if an average particle diameter ($D_{50}$) of the flaked graphite particles is more than 30 μm, a liquid supplying property and the like deteriorate, and thus it is preferred that an average particle diameter ($D_{50}$) of the flaked graphite particles is 5 to 30 μm. Furthermore, if a packing density of the positive electrode mixture layer is less than 2.00 g/cc, an enough output power is not obtained, if a packing density of the positive electrode mixture layer is higher than 2.80 g/cc, distortion occurs in the electrode plate, and thus it is preferred that a packing density of the positive electrode mixture layer is 2.00 to 2.80 g/cc. More preferably, a packing density of the positive electrode mixture layer is 2.00 to 2.73 g/cc.

In the present aspect of the invention, as a positive electrode active material in the nonaqueous electrolyte secondary battery, one of or a mixture of two or more compounds including $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1), $LiFePO_4$, lithium transition-metal compounds represented by $Li_{1+a}Ni_xCo_yM_zO_2$ (M=at least one element selected from Mn, Al, Ti, Zr, Nb, B, Mg, and Mo, $0 \leq a \leq 0.3$, $0.1 \leq x \leq 1$, $0 \leq y \leq 0.5$, $0 \leq z \leq 0.9$, a+x+y+z=1), and lithium transition-metal compounds represented by $Li_{1+a}Ni_xCo_yMn_zM_bO_2$ (M=at least one element selected from Al, Ti, Zr, Nb, B, Mg, and Mo, $0 \leq a \leq 0.15$, $0.25 \leq x \leq 0.45$, $0.25 \leq y \leq 0.45$, $0.25 \leq z \leq 0.35$, $0 \leq b \leq 0.05$, a+x+y+z+b=1), and the like may be used.

In the present aspect of the invention, as a nonaqueous solvent (organic solvent) composing a nonaqueous electrolyte, carbonates, lactones, ethers, esters, and the like commonly used in the nonaqueous electrolyte secondary battery may be used, and two or more kinds of the solvents may also be used as a mixture. Among these solvents, the carbonates, the lactones, the ethers, the ketones, and the esters and the like are preferable, and the carbonates are used more suitably.

Specific examples include ethylene carbonate (EC), propylene carbonate, butylene carbonate, fluoroethylene carbonate (FEC), 1,2-cyclohexyl carbonate (CHC), cyclopentanone, sulfolane, 3-methylsulfolane, 2,4-dimethylsulfolane, 3-methyl-1,3-oxazolidin-2-one, dimethyl carbonate (DMC), methyl ethyl carbonate (EMC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyltetrahydrofuran, 1,3-dioxolane, methyl acetate, ethyl acetate, and 1,4-dioxane.

In the present aspect of the invention, in terms of improving a charge and discharge efficiency, a mixed solvent of EC and chain carbonate such as DMC, EMC, and DEC is suitably used, and asymmetric chain carbonate such as EMC is preferred. Moreover, unsaturated cyclic carbonate such as vinylene carbonate (VC) may be added to the nonaqueous electrolyte.

In the present aspect of the invention, as a solute of the nonaqueous electrolyte, lithium salts commonly used as a solute in the nonaqueous electrolyte secondary battery may be used. Examples of these lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$, and a mixture thereof. Among these compounds, $LiPF_6$ (lithium hexafluoro phosphate) is preferably used. A concentration of the solute with respect to the nonaqueous solvent is preferably 0.5 to 2.0 mol/L.

Moreover, in the nonaqueous electrolyte secondary battery of the present aspect of the invention, at the time of forming the positive electrode mixture layer, it is preferable that an elongation percentage of the positive electrode substrate in a compression process is less than 0.07%.

In the positive electrode plate which is formed so that the uncoated part would be formed along a long side of the continuous positive electrode substrate coated with the positive electrode mixture layer containing the positive electrode active material, in the compression process at the time of forming the positive electrode mixture layer, elongation of a side having the positive electrode mixture layer is larger than the positive electrode mixture layer uncoated part, so that the distortion of the positive electrode plate becomes large, thereby generating a rolling gap when the rolled electrode is prepared. When an elongation percentage in the compression process at the time of forming the positive electrode mixture layer of the positive electrode substrate is 0.07% or more, the rolling gap tends to be generated especially when the electrode is rolled. Since the rolling gap may cause the inner short circuit, preferably an elongation percentage in the compression process at the time of forming the positive electrode mixture layer of the positive electrode substrate is less than 0.07%. The elongation percentage in this specification is a value calculated by the measurement method described in detail in the following "Measurement Method for Elongation Percentage".

Moreover, in the nonaqueous electrolyte secondary battery of the present aspect of the invention, it is preferable that the positive electrode substrate is aluminum foil or aluminum alloy foil with a tensile strength of 150 N/mm² or more and a thickness of 10 to 30 μm.

The aluminum foil or the aluminum alloy foil is generally used as the positive electrode substrate of the nonaqueous electrolyte secondary battery. When a tensile strength of the positive electrode substrate is less than 150 N/mm², the positive electrode substrate is easy to be elongated, so that distortion occurs in the positive electrode plate, thus a tensile strength of 150 N/mm² or more is preferred. When a tensile strength of the positive electrode substrate is 150 N/mm² or more, the higher a tensile strength of the positive electrode substrate is, the more preferable. Moreover, when a thickness of the positive electrode substrate is less than 10 μm, the substrate tends to be cut to become difficult for handling, and when a thickness of the positive electrode substrate is more than 30 μm, the battery capacity is reduced, thus preferably a thickness is 10 to 30 μm.

Moreover, in the nonaqueous electrolyte secondary battery of the present aspect of the invention, it is preferable that the conductive material includes at least one of fibrous carbon with an average fiber diameter of 50 to 300 nm and carbon black with an average particle diameter ($D_{50}$) of 20 to 100 nm.

Furthermore, when the positive electrode mixture layer further includes, as a conductive material, at least one of fibrous carbon with an average fiber diameter of 50 to 300 nm and carbon black with an average particle diameter ($D_{50}$) of 20 to 100 nm, the compression linear pressure in order to obtain the positive electrode plate with a predetermined thickness with keeping the high output characteristics can be reduced. In the case that an average fiber diameter of fibrous carbon is more than 300 nm or that an average particle diameter ($D_{50}$) of carbon black is more than 100 nm, the resistance reducing effect as a conductive material is reduced, thus the manufacture of a high power battery becomes difficult. In the case that an average fiber diameter of fibrous carbon is less than 50 nm or that an average particle diameter ($D_{50}$) of carbon black is less than 20 nm, dispersibility of the conductive material deteriorates. When an amount of one of or both of fibrous carbon and carbon black added to the positive electrode active material layer is 1 to 30% by mass to the whole amount of the conductive material, especially the output characteristics and the cycle characteristics can be improved.

Moreover, in the nonaqueous electrolyte secondary battery of the present aspect of the invention, it is preferable that a tap density of the positive electrode active material is 2.3 g/cc or more.

According to the nonaqueous electrolyte secondary battery of the present aspect of the invention, when a tap density of the positive electrode active material is less than 2.3 g/cc, a packing property of the positive electrode active material is low, and in order to obtain the positive electrode plate with a predetermined thickness, the compression linear pressure needs to be high, the distortion tends to occur in the electrode plate. Accordingly, preferably a tap density of the positive electrode active material is 2.3 g/cc or more. An upper limit value of a tap density of the positive electrode active material depends on a density of the positive electrode active material itself.

Moreover, in the nonaqueous electrolyte secondary battery of the present aspect of the invention, as the positive electrode active material, lithium transition-metal compounds represented by $Li_{1+a}Ni_xCo_yM_zO_2$ (M=at least one element selected from Mn, Al, Ti, Zr, Nb, B, Mg, and Mo, $0 \leq a \leq 0.3$, $0.1 \leq x \leq 1$, $0 \leq y \leq 0.5$, $0 \leq z \leq 0.9$, a+x+y+z=1) may be used.

Moreover, in the nonaqueous electrolyte secondary battery of the present aspect of the invention, as the positive electrode active material, lithium transition-metal compounds represented by $Li_{1+a}Ni_xCo_yMn_zM_bO_2$ (M=at least one element selected from Al, Ti, Zr, Nb, B, Mg, and Mo, $0 \leq a \leq 0.15$, $0.25 \leq x \leq 0.45$, $0.25 \leq y \leq 0.45$, $0.25 \leq z \leq 0.35$, $0 \leq b \leq 0.05$, a+x+y+z+b=1) may be used.

In comparison with the case of a nonaqueous electrolyte secondary battery using a positive electrode active material with a high initial effect such as $LiCoO_2$, $LiMn_2O_4$, the nonaqueous electrolyte secondary battery using the positive electrode active material composed of these lithium transition-metal compounds has a nature that an output voltage of the battery comparatively moderately deteriorates because an internal resistance at an end stage of discharging becomes gradually high in a discharge curve, and thus the nonaqueous electrolyte secondary battery suitable for EVs, HEVs and the like can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
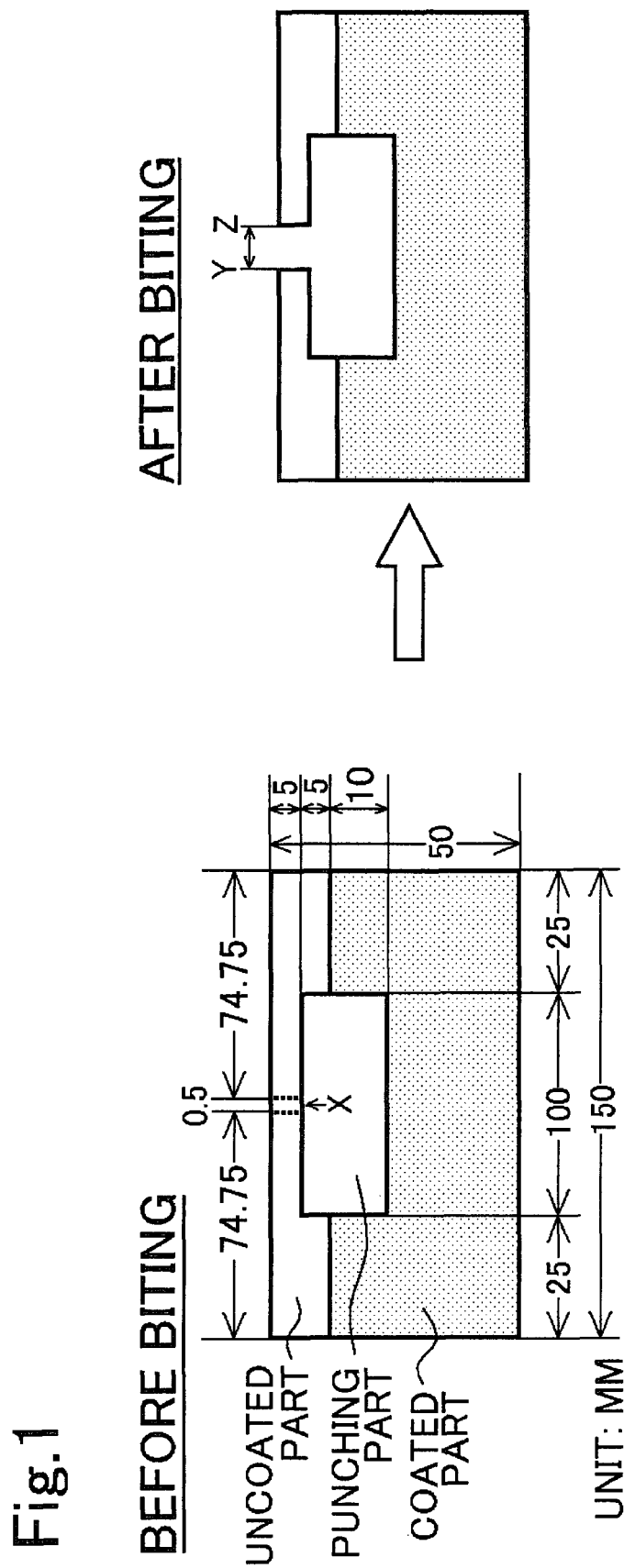
FIG. 1 is a figure showing a measurement method for an elongation percentage of a positive electrode plate.

Hereinafter, exemplary embodiments of the invention will be described in detail with Examples and Comparative Example. However, the Examples described below are illustrative examples of nonaqueous electrolyte secondary batteries for embodying the technical spirit of the invention, and are not intended to limit the invention to the Examples, and the invention may be equally applied to various modified batteries without departing from the technical spirit described in the claims.

First, a manufacturing method for a positive electrode plate common to Examples and Comparative Example and measurement methods for various physical properties of the positive electrode plates will be described.

Manufacture of Positive Electrode Plate $Li_2CO_3$ and $(Ni_{0.35}Co_{0.35}Mn_{0.3})_3O_4$ were mixed so that a molar ratio of Li and $(Ni_{0.35}Cu_{0.35}Mn_{0.3})$ would be 1:1. Then, the mixture was burned in air atmosphere at 900° C. for 20 hours to obtain lithium transition metal oxide represented by $LiNi_{0.35}CO_{0.35}Mn_{0.3}O_2$ with an average particle diameter of 11.4 μm and a tap density of 2.5 g/cc as a positive electrode active material. 88 parts by mass of the positive electrode active material obtained above, 7 parts by mass of flaked graphite with an average thickness of 0.8 μm and an average particle diameter ($D_{50}$) of 6.3 μm and 2 parts by mass of vapor grown carbon fiber with a fiber diameter of 150 nm and an average fiber length of 6 μm as conductive materials, and an N-methyl-2-pyrrolidone (NMP) solution of 3 parts by mass of a solid content of polyvinylidenefluoride (PVdF) as a binder were kneaded to prepare a positive electrode mixture slurry. The prepared positive electrode mixture slurry was coated on an aluminum alloy foil with a tensile strength of 250 N/mm$^2$ and a thickness of 15 μm as a positive electrode substrate and then dried to form a positive electrode mixture layer. Then, the positive electrode mixture layer was compressed using a compression roll until the layer had a packing density of 2.57 g/cc, and cut into a predetermined size to prepare a positive electrode plate A.

Moreover, except that a positive electrode packing density was 2.73 g/cc, a positive electrode plate B was prepared in the same manner as the positive electrode plate A.

Furthermore, except that a positive electrode packing density was 3.02 g/cc, a positive electrode plate C was prepared in the same manner as the positive electrode plate A.

Moreover, except that, in place of the flaked graphite with an average thickness of 0.8 μm, flaked graphite with an average thickness of 1.4 μm and an average particle diameter ($D_{50}$) of 6.3 μm was used as a conductive material and a packing density after compression was 2.68 g/cc, a positive electrode plate D was prepared in the same manner as the positive electrode plate A.

Moreover, except that, in place of the flaked graphite with an average thickness of 0.8 μm, flaked graphite with an average thickness of 3.3 μm and an average particle diameter ($D_{50}$) of 6.3 μm was used as a conductive material and a packing density after compression was 2.75 g/cc, a positive electrode plate E was prepared in the same manner as the positive electrode plate A.

Furthermore, except that 5 parts by mass of flaked graphite with an average thickness of 0.8 μm and an average particle diameter ($D_{50}$) of 6.3 μm and 3 parts by mass of vapor grown carbon fiber with a fiber diameter of 150 nm and an average fiber length of 6 μm were used as conductive materials and a packing density after compression was 2.68 g/cc, a positive electrode plate F was prepared in the same manner as the positive electrode plate A.

Measurement Method for Physical Properties of Each Conductive Material

Particle diameters of flaked graphite and carbon black were measured using a laser diffraction particle size distribution analyzer, and the value when a cumulative particle diameter reached 50% was regarded as an average particle diameter ($D_{50}$). Moreover, as for an average thickness of flaked graphite, the prepared electrode plate was cut by a cross section polisher, the cross section was observed under an SEM (scanning electron microscope), and thicknesses of the flaked graphites in 100 μm$^2$ were measured to calculate a mean value. Moreover, as for an average fiber diameter of fibrous carbon, a powder SEM observation was performed, fiber diameters of the fibrous carbon in 100 μm$^2$ were measured to calculate a mean value.

Measurement Method for Compression Linear Pressure

A compressive force needed when the positive electrode plate was compressed so as to have a predetermined packing density was divided by a coated width of the electrode plate to be a compression linear pressure.

Measurement Method for Elongation Percentage

An elongation percentage of the positive electrode plate was measured in the following manner. A positive electrode plate was compressed using a compression roll so as to have a predetermined packing density. The compressed positive electrode plate with the formed positive electrode mixture layer was formed into the shape shown in FIG. 1 using a jig, a punching part with a size of 15 mm×100 mm was formed so as to have the positional relation shown in FIG. 1, and then an incision with a width of 0.5 mm was formed at position X. Since distortion occurs in the rolled positive electrode plate, when an incision is formed at the position X, a clearance is generated at the position X, and then a distance between Y and Z of the clearance was measured. An elongation percentage (%) was calculated using the formula below.

Elongation percentage (%)=((distance between Y and Z+150)/150)×100−100

Measurement Method for IV Resistance Value

IV resistance value was measured as for the positive electrode plates B, D and E, without forming a battery, using a common tripolar beaker cell. A nonaqueous electrolyte dissolving 1 mol/L of $LiPF_6$ as a solute in a mixed solvent of EC as a cyclic carbonate and EMC as a chain carbonate with a volume ratio of 3:7 was used. Moreover, metallic lithium was used in a counter electrode as negative electrode and a reference electrode, respectively. Under the room temperature of 25° C., at a state charged at a charging current of 1 It until a voltage level reached a state of charge of 50%, then charging was performed at ⅓ It for 10 seconds and a battery voltage was recorded, and then discharging was performed at the same current value for 10 seconds and a battery voltage was recorded. Then, at currents of 1, 3, 5, 10 and 15 It, similar charging and discharging were performed, respective battery voltages were measured, and respective current values and battery voltages were plotted to calculate IV characteristic value at the time of charging.

As a pilot study, positive electrode plates with various elongation percentages were prepared, and a range where a rolling gap was not generated practically at the time of preparing a rolled electrode was investigated. As a result, it was ascertained that the rolling gaps became obvious when an elongation percentage was 0.07% or more. Moreover, the linear pressure and the elongation percentage when respective packing densities were obtained in the positive electrode plates A to F are shown in Table 1, together with the contents of various conductive materials.

TABLE 1

| positive electrode plate | (A)/(A + B + C) (%) | flaked graphite A | average thickness of flaked graphite (μm) | vapor grown carbon fiber B | carbon black C | packing density (g/cc) | compression linear pressure (kg/cm) | elongation percentage (%) | discharge side IV resistance (Ω) | charge side IV resistance (Ω) |
|---|---|---|---|---|---|---|---|---|---|---|
| A | 78 | 7 parts by mass | 0.8 | 2 parts by mass | 0 parts by mass | 2.57 | 62.7 | 0.05 | — | — |
| B | 78 | 7 parts by mass | 0.8 | 2 parts by mass | 0 parts by mass | 2.73 | 77.5 | 0.06 | 0.87 | 1.02 |
| C | 78 | 7 parts by mass | 0.8 | 2 parts by mass | 0 parts by mass | 3.02 | 121.8 | 0.07 | — | — |
| D | 78 | 7 parts by mass | 1.4 | 2 parts by mass | 0 parts by mass | 2.68 | 93.2 | 0.07 | 0.90 | 1.08 |

TABLE 1-continued

| positive electrode plate | (A)/ (A + B + C) (%) | flaked graphite A | average thickness of flaked graphite (μm) | vapor grown carbon fiber B | carbon black C | packing density (g/cc) | compression linear pressure (kg/cm) | elongation percentage (%) | discharge side IV resistance (Ω) | charge side IV resistance (Ω) |
|---|---|---|---|---|---|---|---|---|---|---|
| E | 78 | 7 parts by mass | 3.3 | 2 parts by mass | 0 parts by mass | 2.75 | 106.4 | 0.07 | 0.93 | 1.13 |
| F | 62.5 | 5 parts by mass | 0.8 | 3 parts by mass | 0 parts by mass | 2.68 | 93.0 | 0.07 | — | — |

From the results shown in Table 1, the following is found. That is, from the results of the positive electrode plates A to C, when a packing density is made large, a required compression linear pressure becomes large and an elongation percentage also becomes large. In addition, in the case that the flaked graphite with an average thickness of 0.8 μm is mixed so as to be 78% by mass with respect to the whole positive electrode conductive materials, when a packing density is 2.80 g/cc or below, a compression linear pressure of 80 kg/cm or below and an elongation percentage of 0.06% or below can be kept. In addition, in the case of the positive electrode plate B, a discharge side IV resistance value is 0.87Ω, a charge side IV resistance value is 1.02Ω, and thus the internal resistance is quite low. However, in the case of the positive electrode plate F wherein the flaked graphite with an average thickness of 0.8 μm is mixed so as to be 62.5% by mass with respect to the whole positive electrode conductive materials, a packing density is 2.68 g/cc, whereas a linear pressure is high as 93.0 kg/cm, and moreover, an elongation percentage is high as 0.07%. That is, it is clear that, when the flaked graphite content becomes low, an inhibition effect of the linear pressure is reduced and an elongation percentage becomes high.

Moreover, from the results of the positive electrode plates D and E, it is clear that, when an average thickness of the flaked graphite is 1.4 μm or more, even if a packing density is made to be low, a linear pressure becomes high, so that an elongation percentage reaches 0.07%. Furthermore, in the case of the positive electrode plates D and E, the discharge side IV resistance values are 0.90Ω and 0.93Ω, respectively, the charge side IV resistance values are 1.08Ω and 1.13Ω, respectively, and the internal resistance is higher than that of the positive electrode plate B. This means that, if an average thickness of the flaked graphite is at least 1.4 μm or more, the flaked graphite particles as a conductive material is too large and the resistance reducing effect of the conductive material is reduced, thus it becomes difficult to manufacture a high power battery.

Accordingly, from comprehensive consideration of the results of the positive electrode plates A to F with interpolation of each result, when an average particle diameter ($D_{50}$) is 6.3 μm, if, using flaked graphite with an average thickness of 1.0 μm or below, a flaked graphite content in the conductive material is made to be 70% by mass or more, it is ascertained that the electrode plate keeping a packing density of approximately 2.80 g/cc and with a compression linear pressure of 80 kg/cm or below and an elongation percentage of 0.06% or below can be obtained. Moreover, if an average thickness of the flaked graphite particles is more than 1.0 μm, at the time of the positive electrode plate compression, a compression linear pressure becomes high, so that distortion in the positive electrode tends to be generated, and the too large flaked graphite particles reduces the resistance reducing effect of the particles as a conductive material, so that the internal resistance becomes large to become difficult to manufacture a high power battery. If an average thickness of the flaked graphite particles is thinner than 0.1 μm, the flaked graphite particles tend to be dispersed, so that handling becomes difficult, and dispersibility of the slurry is deteriorated, so that the electrode quality deteriorates. Thus, it is preferred that an average thickness of the flaked graphite particles is 0.1 to 1.0 μm.

Furthermore, if a packing density of the positive electrode mixture layer is higher than 2.80 g/cc, distortion occurs in the positive electrode plate, so that it becomes difficult to keep an elongation percentage of less than 0.07%. Thus, an upper limit of a packing density of the positive electrode mixture layer should be 2.80 g/cc. Moreover, if a packing density of the positive electrode mixture layer is less than 2.00 g/cc, a positive electrode active material content per volume is too low to obtain enough output power, thus a packing density of the positive electrode mixture layer is preferably 2.00 to 2.80 g/cc. A more preferable packing density of the positive electrode mixture layer is 2.00 to 2.73 g/cc.

In the positive electrode plates A to F, the flaked graphite with an average particle diameter ($D_{50}$) of 6.3 μm is used. If an average particle diameter ($D_{50}$) of the flaked graphite particles is less than 5 μm, the dispersibility deteriorates, and if an average particle diameter ($D_{50}$) of the flaked graphite particles is more than 30 μm, a liquid supplying property and the like deteriorate. Thus, it is preferred that an average particle diameter ($D_{50}$) of the flaked graphite particles is 5 to 30 μm. Furthermore, in the positive electrode plates A to F, the examples for a mixing ratio of the positive electrode conductive material to the positive electrode mixture is 8 parts by mass (the positive electrode plate F) and 9 parts by mass (the positive electrode plates A to E) are shown. If a mixing ratio to the positive electrode mixture is less than 5% by mass, a formability of the positive electrode mixture deteriorates and enough output characteristics is not obtained, and if a mixing ratio to the positive electrode mixture is more than 15% by mass, since the conductive material does not take part in battery reactions, a battery capacity is reduced, and since the compression linear pressure becomes high when the positive electrode active material mixture is compressed to obtain the positive electrode plate with a predetermined thickness, distortion in the electrode plate tends to occur. Accordingly, it is preferred that a mixing ratio of the positive electrode conductive material to the positive electrode mixture is 5 to 15% by mass.

In conventional nonaqueous electrolyte secondary batteries, in order to enlarge a battery capacity, the positive electrode mixture with a packing density of 3.0 g/cc or more is generally used, however, from the results shown in Table 1, it is shown that the batteries with the large packing densities are unsuitable. These phenomenons occur only when the positive electrode plate which is formed so that the uncoated part would be formed along at least one long side of the continuous positive electrode plate coated with the positive electrode mixture layer containing the positive electrode active material is used.

Next, specific manufacturing methods for nonaqueous electrolyte secondary batteries using various positive electrode plates and measurement methods for a battery discharge capacity and the like will be described.

Preparation of Negative Electrode Plate

Graphite as a negative electrode active material, an aqueous solution dissolving carboxymethylcellulose (CMC) as a binder, styrene butadiene rubber (SBR) as a binder, and polyimide powder were mixed so that a mass ratio of negative electrode active material:binder:polyimide would be 96:2:2, and then the whole was kneaded to prepare a negative electrode slurry. Next, the prepared negative electrode slurry was coated on a copper foil as a negative electrode substrate and dried to form a negative electrode active material layer. Then, the whole was compressed using a compression roller until a predetermined packing density was obtained to prepare a negative electrode plate.

Preparation of Nonaqueous Electrolyte

As for preparation of a nonaqueous electrolyte, lithium hexafluoro phosphate ($LiPF_6$) as a solute was dissolved in a mixed solvent of EC as a cyclic carbonate and EMC as a chain carbonate with a volume ratio of 3:7 so as to have a concentration of 1 mol/liter. Only 1% by mass of vinylene carbonate (VC) was added to the obtained solution to prepare a nonaqueous electrolyte.

Manufacture of Nonaqueous Electrolyte Secondary Battery

Example 1

Figure 2:
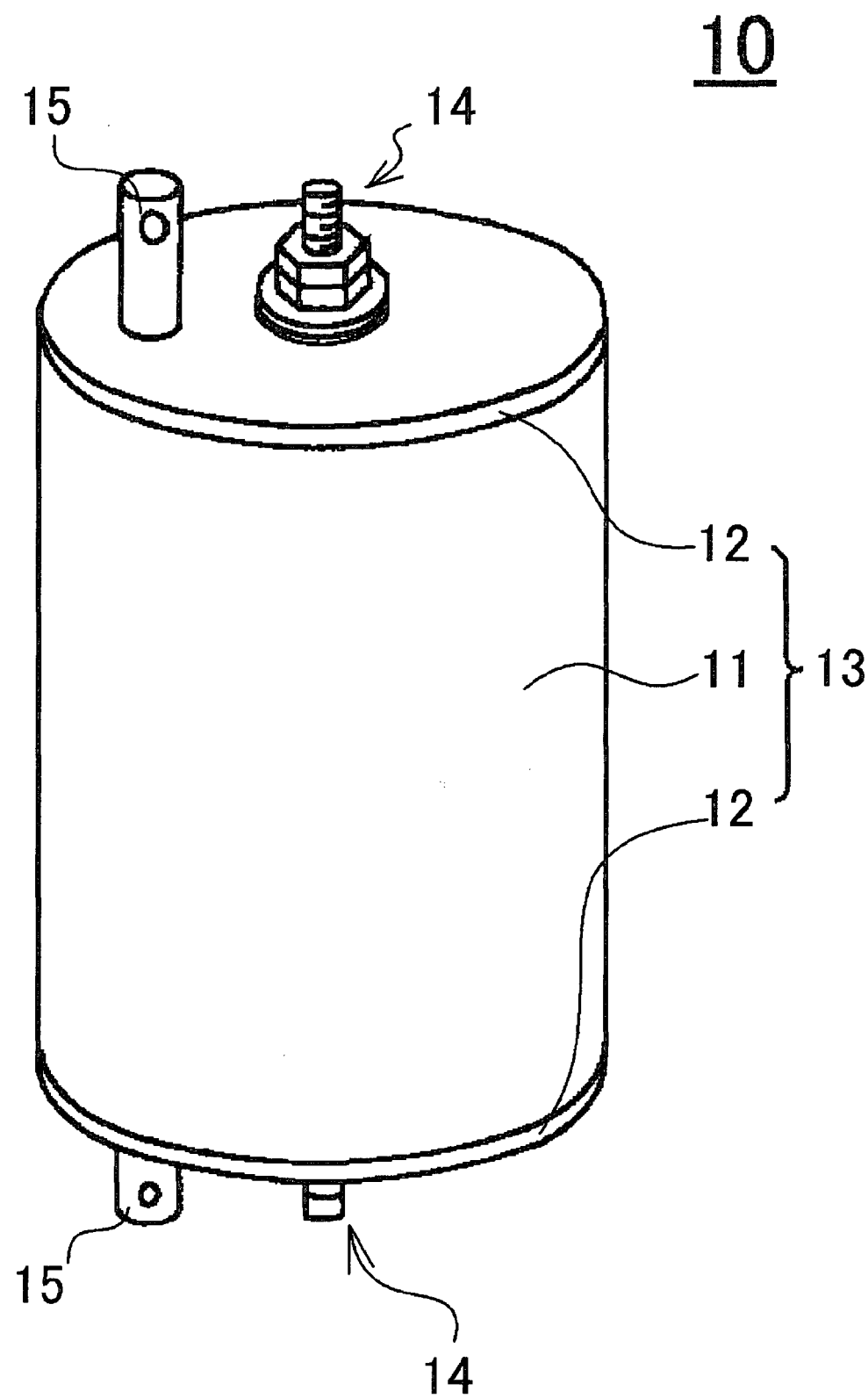
FIG. 2 is a perspective view of a cylindrical nonaqueous electrolyte secondary battery.
Figure 3:
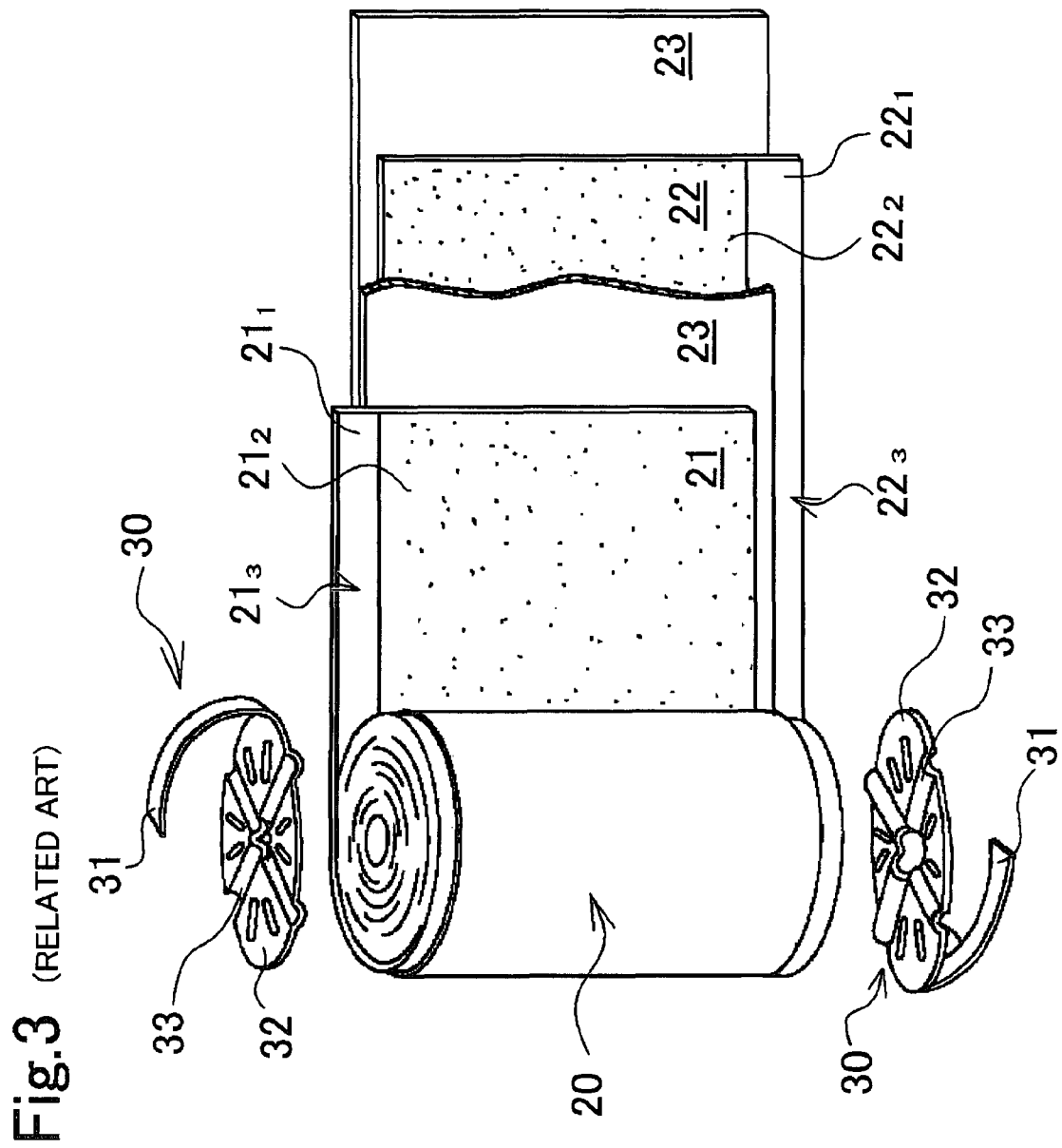
FIG. 3 is an exploded perspective view of a rolled electrode in the cylindrical nonaqueous electrolyte secondary battery in FIG. 2.
Figure 4:
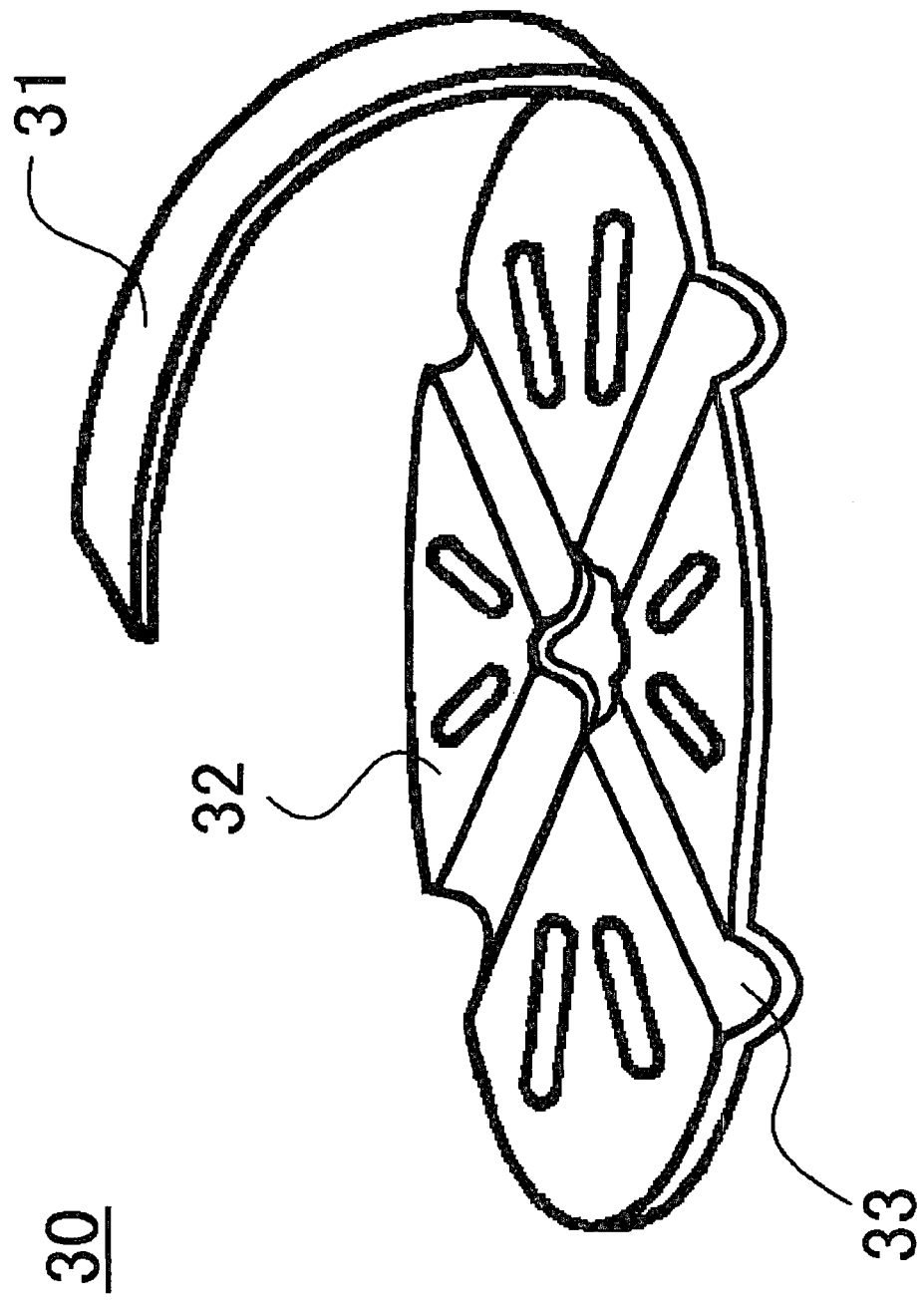
FIG. 4 is a perspective view of the collector plate shown in FIG. 3.
Figure 5:
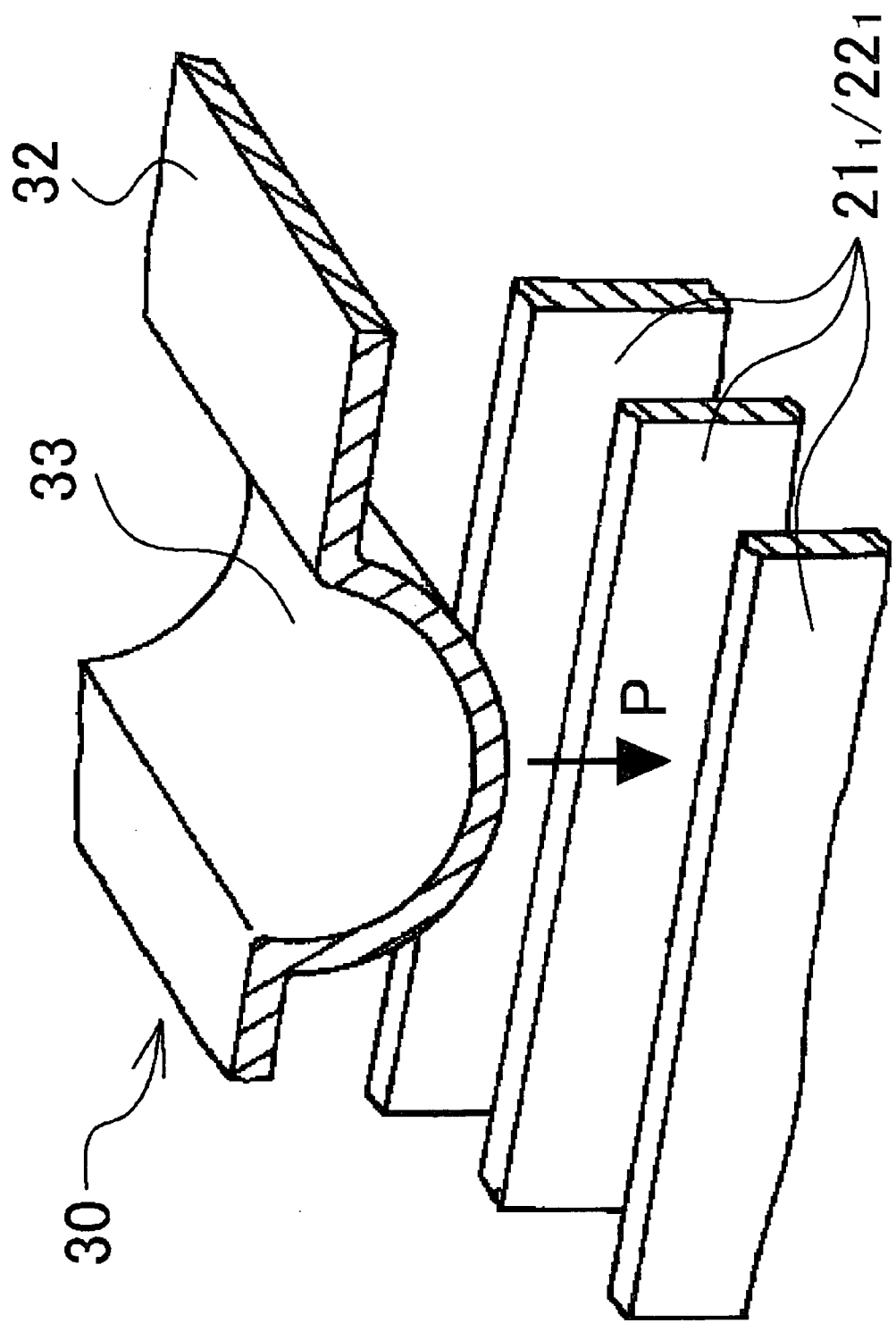
FIG. 5 is a partially broken perspective view showing a state before the collector plate is pressed to the rolled electrode.
Figure 6:
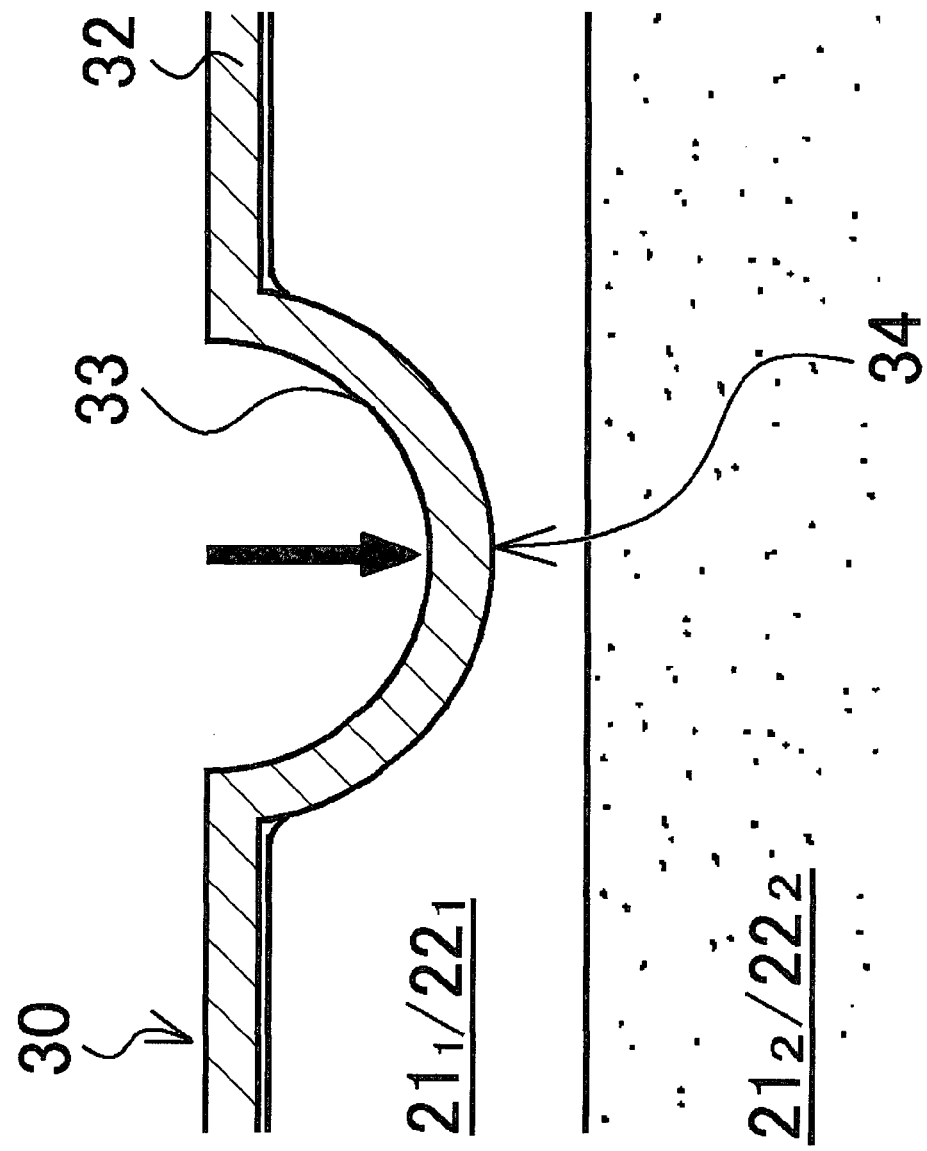
FIG. 6 is a partially broken elevation view showing a state where the collector plate is pressed to the rolled electrode and a laser beam is irradiated.

A separator made of polyethylene microporous membrane was interposed between the positive electrode plate A prepared above and the negative electrode plate prepared above to be laminated, and then the whole was rolled spirally as shown in FIG. 3 to prepare a spiral electrode group. Uncoated parts were formed on the positive and the negative electrode plates, and the uncoated parts configured substrate borders protruded from separator edges of the spiral electrode group. Next, in both ends of the spiral electrode group, respective collector plates similar to the plate shown in FIG. 4 were pressed on the substrate borders as shown in FIG. 5, and fixed as shown in FIG. 6 by laser welding, then the spiral electrode group was inserted into a cylindrical-shaped metal outer can, and leading ends of leading parts protruded from edges of the collector plates were connected to the electrode terminal devices, respectively. Next, the nonaqueous electrolyte prepared above was poured into the metal outer can and the can was sealed up to manufacture a nonaqueous electrolyte secondary battery of Example 1. A shape of the nonaqueous electrolyte secondary battery of Example 1 is similar to that shown in FIG. 2.

Example 2

Except that the positive electrode plate containing 9% by mass of flaked graphite with an average thickness of 0.8 μm and an average particle diameter ($D_{50}$) of 6.3 μm and 1% by mass of vapor grown carbon fiber with an average fiber diameter of 150 nm and an average fiber length of 6 μm, as the conductive materials, was used, a nonaqueous electrolyte secondary battery of Example 2 was manufactured in the same manner as in Example 1.

Example 3

Except that the positive electrode plate containing 7% by mass of flaked graphite with an average thickness of 0.8 μm and an average particle diameter ($D_{50}$) of 6.3 μm and 2% by mass of carbon black with an average particle diameter ($D_{50}$) of 50 nm, as the conductive material, was used, a nonaqueous electrolyte secondary battery of Example 3 was manufactured in the same manner as in Example 1.

Example 4

Except that the positive electrode plate containing 8% by mass of flaked graphite with an average thickness of 0.8 μm and an average particle diameter ($D_{50}$) of 6.3 μm as the conductive material was used, a nonaqueous electrolyte secondary battery of Example 4 was manufactured in the same manner as in Example 1.

Example 5

Except that the positive electrode plate containing 10% by mass of flaked graphite with an average thickness of 0.8 μm and an average particle diameter ($D_{50}$) of 6.3 μm as the conductive material was used, a nonaqueous electrolyte secondary battery of Example 5 was manufactured in the same manner as in Example 1.

Example 6

Except that the positive electrode plate containing 12% by mass of flaked graphite with an average thickness of 0.8 μm and an average particle diameter ($D_{50}$) of 6.3 μm as the conductive material was used, a nonaqueous electrolyte secondary battery of Example 6 was manufactured in the same manner as in Example 1.

Comparative Example

Except that the positive electrode plate containing 5% by mass of vapor grown carbon fiber with an average fiber diameter of 150 nm and an average fiber length of 6 μm as the conductive material was used, a nonaqueous electrolyte secondary battery of Comparative Example was manufactured in the same manner as in Example 1.

Measurement Method for Battery Discharge Capacity

As for a battery discharge capacity, under the room temperature of 25° C., charging was performed at a constant current of 1 It=5 A, and after reaching a battery voltage of 4.1 V, charging was performed at a constant voltage of 4.1 V for 2 hours, then discharging was performed at a constant current of ⅓ It until a battery voltage reaches 3.0 V, and after reaching a battery voltage of 3.0 V, discharging was continued at a constant voltage of 3.0 V for 5 hours, and a battery capacity (Ah) was calculated from the total current amount running at the time of the discharging.

Measurement Methods for Output Power, Input Power, and Output and Input Retention Ratios Under the room temperature of 25° C., at a state charged at a charging current of 5 A until a voltage level reached a state of charge of 50%, discharging was performed at 5 A for 10 seconds, a battery voltage was recorded, then charging was performed at the same current value for 10 seconds, and a battery voltage was recorded. Then, similar discharging and charging were performed at currents of 10, 30, 50, and 80 A, respective battery voltages were measured, respective current values and battery voltages were plotted, then an output power (W) was calculated from a relation between the battery voltage and the current amount at the time of discharging, and an output power (W) was calculated from a relation between the battery voltage and the current amount at the time of charging. Moreover, as for the batteries of Example 1 and Comparative Example, after charging and discharging were repeated 3,000 times at 70° C. at a constant current of 3 It=15 A in a range of state of charge of 50 to 70%, an output or input power was measured, and a ratio of the measured output or input power to the initial output or input power was calculated as an output power retention ratio (%) or an input power retention ratio (%). The concluded results are shown in Table 2.

TABLE 2

| | (A)/(A + B + C) (%) | flaked graphite A | average thickness of flaked graphite (μm) | vapor grown carbon fiber B | carbon black C | compression linear pressure (kg/cm) | capacity (Ah) | output power (W) | output power retention ratio (%) | input power retention ratio (%) |
|---|---|---|---|---|---|---|---|---|---|---|
| Ex1 (*1) | 78 | 7 parts by mass | 0.8 | 2 parts by mass | 0 parts by mass | 63 | 5.2 | 622 | 72.3 | 81.3 |
| Ex2 | 90 | 9 parts by mass | 0.8 | 1 parts by mass | 0 parts by mass | 75 | 5.3 | 531 | — | — |
| Ex3 | 78 | 7 parts by mass | 0.8 | 0 parts by mass | 2 parts by mass | 72 | 5.2 | 620 | — | — |
| Ex4 | 100 | 8 parts by mass | 0.8 | 0 parts by mass | 0 parts by mass | 51 | 5.5 | 480 | — | — |
| Ex5 | 100 | 10 parts by mass | 0.8 | 0 parts by mass | 0 parts by mass | 51 | 5.4 | 528 | — | — |
| Ex6 | 100 | 12 parts by mass | 0.8 | 0 parts by mass | 0 parts by mass | 54 | 5.2 | 497 | — | — |
| CE (*2) | 0 | 0 parts by mass | — | 5 parts by mass | 0 parts by mass | 93 | 4.8 | 620 | 68.4 | 75.4 |

(*1) Ex1: Example 1
(*2) CE: Comparative Example

From the results shown in Table 2, it is clear that, in comparison with the case that only flaked graphite is used (Examples 4 to 6), an addition of at least one of vapor grown carbon fiber or carbon black (Examples 1 to 3) improves the output characteristics. Accordingly, since the reducing effect on the compression linear pressure by the addition of flaked graphite particles is observed in 70% by mass or more with respect to the whole amount of the conductive materials, it is preferred that flaked graphite particles are added in a range of 70% by mass or more and less than 100% by mass with respect to the whole amounts of the conductive materials. Furthermore, more preferably, the ratio is 70% by mass or more and 90% by mass or less. Moreover, even in the case that only fibrous carbon is used (Comparative Example), a good output characteristic is obtained, whereas distortion in the electrode plate occurs due to a high compression linear pressure and the battery capacity and the cycle characteristic deteriorate.

What is claimed is:

1. A nonaqueous electrolyte secondary battery comprising:
   a positive electrode plate having an elongated positive electrode substrate and a positive electrode mixture layer containing a positive electrode active material coated on the positive electrode substrate such that an uncoated part is formed along at least one long side of the positive electrode substrate;
   a negative electrode plate having an elongated negative electrode substrate and a negative electrode mixture layer coated on the negative electrode substrate such that an uncoated part is formed along at least one long side of the negative electrode substrate; and
   a separator laminated between the positive electrode plate and the negative electrode plate;
   the positive electrode plate, the negative electrode plate and the separator being forming a rolled electrode,
   the positive electrode mixture layer including a lithium transition-metal compound capable of insertion and separation of lithium ion, and 5 to 15% by mass of a conductive material with respect to the positive electrode mixture,
   the conductive material containing not less than 70% by mass of flaked graphite particles with an average particle diameter ($D_{50}$) of 5 to 30 μm and an average thickness of 0.1 to 1.0 μm with respect to the whole amount of the conductive material, and a packing density of the positive electrode mixture layer being 2.00 to 2.80 g/cc.

2. The nonaqueous electrolyte secondary battery according to claim 1, wherein an elongation percentage of the positive electrode substrate in a compression process is less than 0.07% at the time of forming the positive electrode mixture layer.

3. The nonaqueous electrolyte secondary battery according to claim 1, wherein the positive electrode substrate is aluminum foil or aluminum alloy foil with a tensile strength of 150 N/mm$^2$ or more and a thickness of 10 to 30 μm.

4. The nonaqueous electrolyte secondary battery according to claim 1, wherein the conductive material includes at least one of fibrous carbon with an average fiber diameter of 50 to 300 nm and carbon black with an average particle diameter ($D_{50}$) of 20 to 100 nm.

5. The nonaqueous electrolyte secondary battery according to claim 1, wherein a tap density of the positive electrode active material is 2.3 g/cc or more.

6. The nonaqueous electrolyte secondary battery according to claim 1, wherein the positive electrode active material is lithium transition-metal compounds represented by $Li_{1+a}Ni_xCo_yM_zO_2$ (M=at least one element selected from Mn, Al, Ti, Zr, Nb, B, Mg, and Mo, $0 \leq a \leq 0.3$, $0.1 \leq x \leq 1$, $0 \leq y \leq 0.5$, $0 \leq z \leq 0.9$, a+x+y+z=1).

7. The nonaqueous electrolyte secondary battery according to claim 1, wherein the positive electrode active material is lithium transition-metal compounds represented by $Li_{1+a}Ni_xCo_yMn_zM_bO_2$ (M=at least one element selected from Al, Ti, Zr, Nb, B, Mg, and Mo, $0 \leq a \leq 0.15$, $0.25 \leq x \leq 0.45$, $0.25 \leq y \leq 0.45$, $0.25 \leq z \leq 0.35$, $0 \leq b \leq 0.05$, a+x+y+z+b=1).

* * * * *